US010217261B2

(12) United States Patent
Li et al.

(10) Patent No.: US 10,217,261 B2
(45) Date of Patent: Feb. 26, 2019

(54) DEEP LEARNING-BASED FACIAL ANIMATION FOR HEAD-MOUNTED DISPLAY

(71) Applicant: Pinscreen, Inc., Westlake Village, CA (US)

(72) Inventors: Hao Li, Santa Monica, CA (US); Joseph J. Lim, Mountain View, CA (US); Kyle Olszewski, Los Angeles, CA (US)

(73) Assignee: PINSCREEN, INC., Santa Monica, CA (US)

( * ) Notice: Subject to any disclaimer, the term of this patent is extended or adjusted under 35 U.S.C. 154(b) by 39 days.

(21) Appl. No.: 15/438,546

(22) Filed: Feb. 21, 2017

(65) Prior Publication Data

US 2017/0243387 A1    Aug. 24, 2017

Related U.S. Application Data

(60) Provisional application No. 62/297,066, filed on Feb. 18, 2016.

(51) Int. Cl.
*G06T 13/40* (2011.01)
*G06K 9/00* (2006.01)
*G06K 9/62* (2006.01)

(52) U.S. Cl.
CPC ......... *G06T 13/40* (2013.01); *G06K 9/00281* (2013.01); *G06K 9/00315* (2013.01); *G06K 9/00744* (2013.01); *G06K 9/6201* (2013.01)

(58) Field of Classification Search
CPC ............... G06T 13/40; G06K 9/00281; G06K 9/00315; G06K 9/00744; G06K 9/6201
See application file for complete search history.

(56) References Cited

U.S. PATENT DOCUMENTS

| 6,504,546 | B1 * | 1/2003 | Cosatto | G06T 13/40 |
| | | | | 345/473 |
| 6,766,299 | B1 * | 7/2004 | Bellomo | G10L 21/06 |
| | | | | 704/276 |
| 9,613,450 | B2 * | 4/2017 | Wang | G06T 13/40 |
| 2004/0120554 | A1 * | 6/2004 | Lin | G06K 9/00335 |
| | | | | 382/118 |
| 2005/0057570 | A1 * | 3/2005 | Cosatto | G06T 13/40 |
| | | | | 345/473 |
| 2011/0131041 | A1 * | 6/2011 | Cortez | G06T 13/205 |
| | | | | 704/235 |
| 2012/0280974 | A1 * | 11/2012 | Wang | G06T 13/40 |
| | | | | 345/419 |

(Continued)

*Primary Examiner* — Abderrahim Merouan
(74) *Attorney, Agent, or Firm* — Socal IP Law Group LLP; Jonathan Pearce (57) ABSTRACT

There is disclosed a system and method for training a set of expression and neutral convolutional neural networks using a single performance mapped to a set of known phonemes and visemes in the form predetermined sentences and facial expressions. Then, subsequent training of the convolutional neural networks can occur using temporal data derived from audio data within the original performance mapped to a set of professionally-created three dimensional animations. Thereafter, with sufficient training, the expression and neutral convolutional neural networks can generate facial animations from facial image data in real-time without individual specific training.

20 Claims, 7 Drawing Sheets

(56) References Cited

U.S. PATENT DOCUMENTS

| | | | |
|---|---|---|---|
| 2015/0310263 A1* | 10/2015 | Zhang | G06K 9/00315 |
| | | | 382/103 |
| 2016/0110922 A1* | 4/2016 | Haring | G06T 13/40 |
| | | | 345/633 |
| 2016/0360970 A1* | 12/2016 | Tzvieli | A61B 5/015 |
| 2018/0025506 A1* | 1/2018 | Li | G06T 13/80 |

* cited by examiner

DEEP LEARNING-BASED FACIAL ANIMATION FOR HEAD-MOUNTED DISPLAY

RELATED APPLICATION INFORMATION

This patent claims priority from U.S. provisional patent application No. 62/297,066 entitled "High-Fidelity Facial and Speech Animation" filed Feb. 18, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to performance capture for real-time reproduction of facial and speech animation.

Description of the Related Art

Users of virtual reality systems have desired the opportunity to interact within a virtual environment, either alone or with others, while in-game or in-virtual environment avatars mirror those users' facial expressions. Examples such as experiencing a virtual "movie theater" with a friend or taking part in a virtual "chat room" with a group of friends are greatly enhanced when a user's avatar within the virtual environment mirrors that user's real-world facial expressions, speech, and visible emotional reactions.

The options for enabling these types of systems are either monetarily expensive or computationally expensive. Either problem places such capabilities outside of presently-available technology to an average virtual reality consumer. The process is all the more complicated given that virtual reality headsets typically block a large portion of an individual's face from external view. Thus, extrapolating facial expressions can be difficult.

The best-performing methods used in conjunction with virtual reality head mounted displays typically rely upon a combination of tracked facial landmarks and depth sensors. However, these types of systems function poorly when a facial region is occluded, either by a user's hands, or when an individual's mouth changes shape so as to hide a landmark (e.g. a user bites his or her lip).

Other systems, for example for tracking a user's eyes and facial movements within a head mounted display rely upon electroencephalograms or electromyograms to derive facial movements from electrical currents within muscles and other facial tissues. These systems typically require a great deal of training to "learn" what specific electric nerve impulses mean in terms of facial movement. Alternatively, a captured facial region (or entire face) may be manually animated by an artist on a frame-by-frame basis (or may have only key-frames animated). This process is computationally (and temporally) intensive. More recently, infrared cameras such as the Fove head mounted display has been used to track eye gaze and eye regions. Regardless, these systems rely upon non-standard (or expensive) sensors, require specialized pre-training by the user, or are too computationally expensive to perform in real-time.

It would, therefore, be desirable if there were a system and process by which facial animation could be enabled for head mounted displays with substantial fidelity in real-time for an on-going virtual reality interaction such that an avatar associated with a wearer of a head mounted display could realistically represent the facial expressions of that wearer during the interaction. It would be preferable if none or extremely limited pre-training were required. The process must be sufficiently processor-friendly to enable it to take place in real-time without overly-taxing currently available computing systems.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

To enable high-fidelity, real-time facial and speech animation RGB and infrared cameras are employed outside (for the mouth) and within (for the eyes) a head mounted display. Properly-trained neural networks can be applied to both sets of image data to derive extremely accurate facial and speech animation by relying upon a corresponding training dataset of a series of users speaking known phonemes (and visemes—facial expressions associated with one pronouncing a particular phoneme) and corresponding professionally-created facial animations.

Thereafter, the two neural networks, one for discovering the likely facial expression and another for biasing the facial expression toward a neutral facial expression, can be applied with facial weights to the results of each network to generate a frame of facial animation that suitably approximates a facial expression from the associated video frame (both mouth and eyes).

As used herein, the phrase "real-time" means of or on the order of milliseconds. Real-time is sufficiently fast that delay between individual action captured in a video stream, creation of the associated facial animation, is imperceptible or nearly-imperceptible to the human eye. "Real-time" is sufficiently fast that the animation of a user's face, for example as a within-VR avatar, may be provided without any substantial delay perceptible to a viewer of the avatar (or the individual acting as the avatar).

Description of Apparatus

Figure 1:
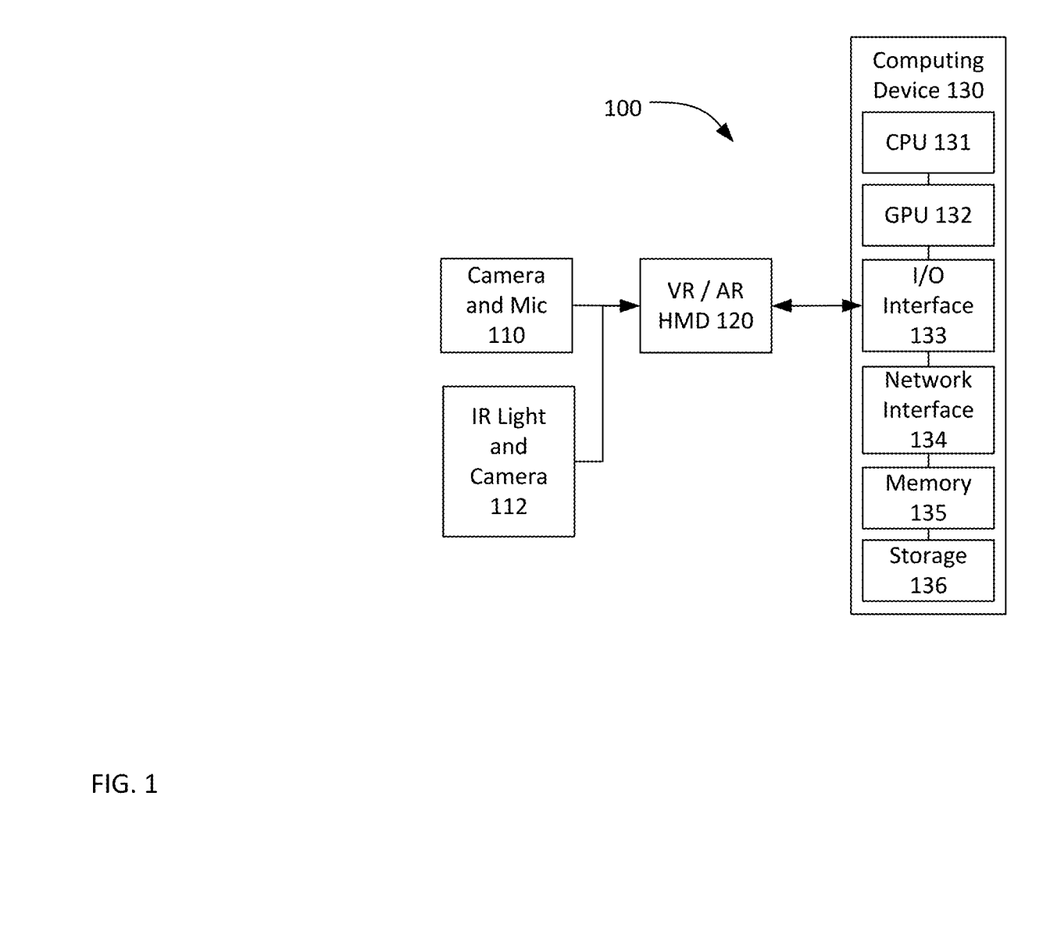
FIG. 1 is a structural diagram of a system for high-fidelity facial and speech animation for VR and AR head mounted displays.

Turning first to FIG. 1, is a structural diagram of a system 100 for high-fidelity facial and speech animation for VR and AR head mounted displays is shown. The system 100 includes an camera and mic 110, an infrared (IR) light and camera 112, a virtual reality (VR)/augmented reality (AR) head mounted display (HMD) 120 and at least one computing device 130. A second computing device may optionally be used for some or all of the real-time operation or during training of the neural networks, depending on the requirements of the specific implementation.

The camera of the camera and mic 110 may be a still camera or, preferably, a video camera capturing an image. The video image created by the camera is, as is any digital video, actually a series of still frames strung together in rapid succession to create the illusion of movement within an associated display when viewed. Throughout the present description, unless otherwise noted, reference to "RGB input" or an "RGB image" means a single frame of an RGB video data stream. The phrase "IR input" or "IR image" means a single frame of an infrared image data stream. The phrase "image data" is generic to both RGB and IR images, meaning a frame of RGB or IR video stream. The systems and processes described herein operate upon a single frame of an RGB and/or IR video data stream, but the systems and processes may be applied repeatedly and in rapid succession to each frame of an RGB and/or IR video data stream, sometimes with reliance upon data from the preceding frame or frames, to continually generate facial data for each frame.

Figure 7:
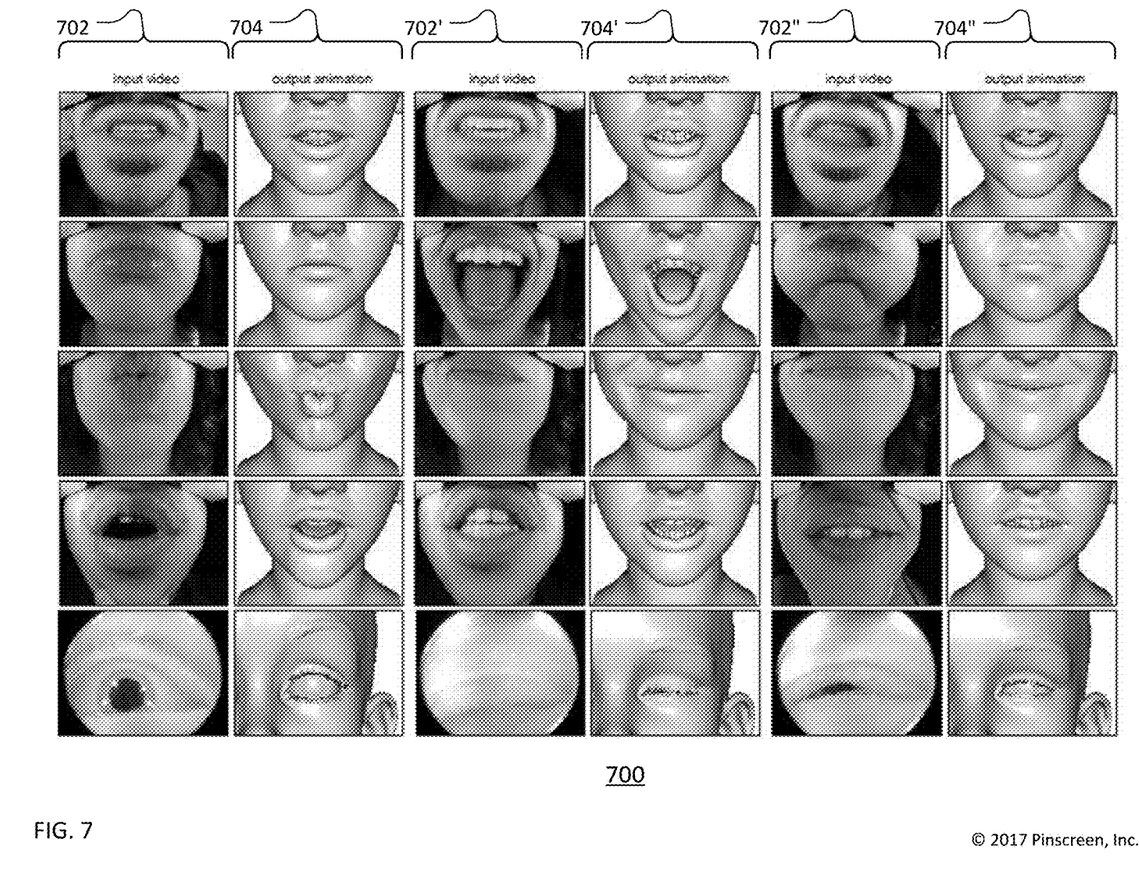
FIG. 7 is a series of examples of input video frames and the resulting animation using a system for high-fidelity facial and speech animation for virtual reality head mounted displays.

The camera of the camera and mic 110 may be affixed in such a position that it can capture the mouth movement and shape while a wearer of the VR/AR HMD 120 is speaking or making other expressions. This camera may be, for example, mounted immediately in front of a wearer of the VR/AR HMD 120's mouth, showing the wearer's chin and mouth. FIG. 7 (discussed below) depicts the types of images captured of a wearer's mouth.

The mic of the camera and mic 110 may be used, for example, to capture audio recitation of phonemes during training of the present system. When in operation, the mic of the camera and mic 110 may capture audio for transmission in conjunction with the visual, animated avatar or, in more-complex systems, for replacement by other audio corresponding to the user's voice, but different (e.g. if a user is a male, adult and an avatar is a child, for example, within a virtual reality game, then the user's voice may be substituted for that of a child).

The IR light and camera 112 may be mounted within a headset, such as the VR/AR HMD 120 such that a wearer's eye movements, iris position, and other image data related to the wearer's eye may be ascertained. The IR light may be used so as to maintain the visual darkness to the naked eye, while still enabling image processing of eye-region images created by the associated IR camera to take place. The IR light and camera 112 are described as a single IR light and camera, but may be two or more IR lights and/or cameras, with at least one of each for each eye. In some VR/AR HMD's 120, the entire region of the eyes may be visible to a single camera within the VR/AR HMD 120. In others, individual IR lights and cameras, or multiple IR lights and/or IR cameras, may be necessary to enable adequate capture of both user's eye regions within the VR/AR HMD 120. Examples of IR images captured in the present system may be seen in FIG. 7.

The VR/AR HMD 120 is a head mounted display suitable for providing two independent images to each of a wearer's eyes so as to simulate a virtual reality environment to a wearer of the VR/AR HMD 120.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or a system-on-a-chip (SOCs). The CPU 131 may be specialized, designed for operations upon visual, graphical, or audio data or may be general purpose processors. Though identified as a central processing unit, the CPU 131 may in fact be multiple processors, for example multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data, particularly vector, shading, faster memory operations and access, along with performing specialized lighting operations. The instruction sets and memory in the GPU 132 are specifically designed for operation upon graphical data. In this way, the GPU 132 may be especially suited to operation upon the image data or to quickly and efficiently performing the complex mathematical operations described herein Like the CPU 131, the GPU 132 is shown as a single graphics processing unit, but may actually be one or more graphics processing units in a so-called multi-core format or linked by a bus or other connection that may together be applied to a single set of or to multiple processing operations.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, WiFi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 121 or GPU 122 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g. a multicore process or group of multicore processors) or a group of GPUs (e.g. a single powerful GPU or a set of GPUs interconnected by SLI or CrossFire®) such that a connected computing device is better-capable of performing processor-intensive tasks such as the convolution discussed more fully below. In some implementations, the one or more additional computing devices may be used to perform more processer-intensive tasks, with the tasks being offloaded via the I/O interface 133 or network interface 134. In particular, the training processes discussed herein may rely upon or more external computing devices.

Figure 2:
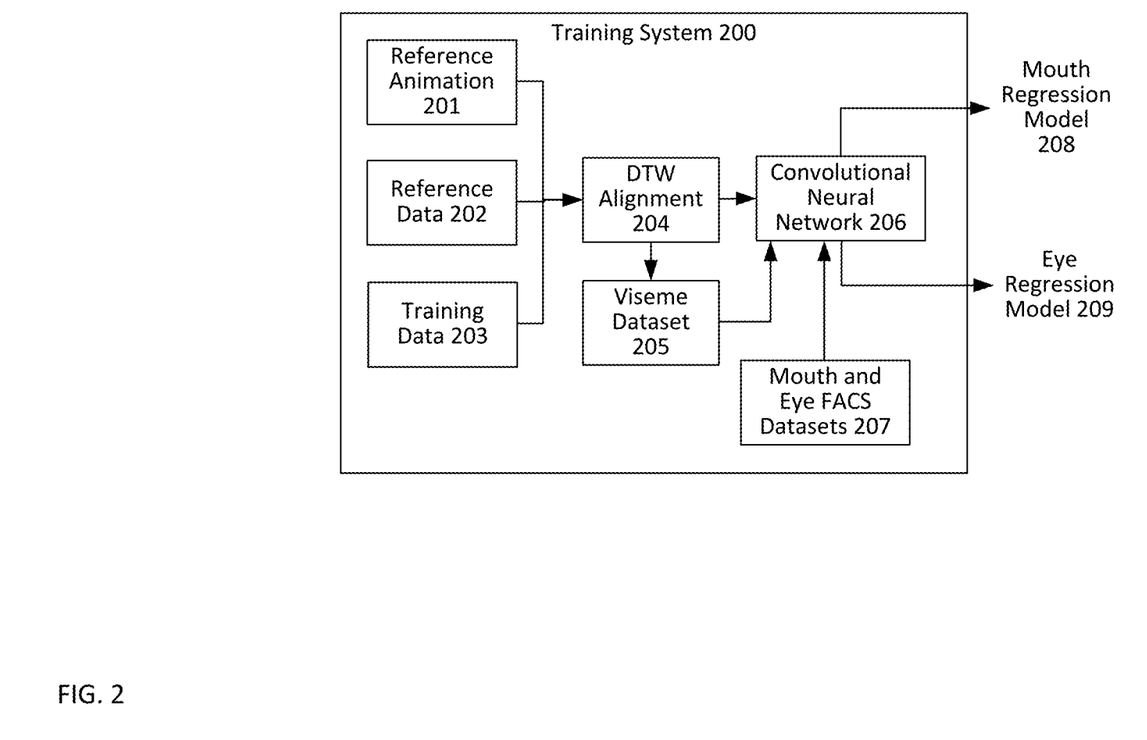
FIG. 2 is a functional diagram of a training system for high-fidelity facial and speech animation for virtual reality head mounted displays.

FIG. 2 is a functional diagram of a training system 200 for high-fidelity facial and speech animation for VR and AR head mounted displays. The training system 200 includes reference animation 201, reference data 202, training data 203, DTW alignment 204, viseme dataset 205, a convolutional neural network 206, and mouth and eye FACS datasets 207. The results of the training generates a mouth regression model 208 and an eye regression model 209.

The training functions occur before the system 300 (FIG. 3) operates to create animations in real-time. First, a set of synchronized audio and video recordings for a series of individuals reciting a list of predetermined training sentences is captured as training data 203. The predetermined training sentences are chosen to vary the approach and retreat from various phonemes to provide a broad and varied dataset of phoneme and visual correspondence in the training data 203. Likewise, more commonly-used phonemes are chosen for repetition to ensure more accuracy. The same set of individuals are also asked to perform a series of facial actions corresponding to the facial action coding system (FACS) for two iterations of each expression. Using this, the rest of the training system may operate.

Using the recorded audio and video recordings and the FACS expressions for a first performance, professional animators create a reference animation/facial position for each frame of the audio and video recordings as a reference animation 201. This animation takes time and is manually completed to ensure that it is of sufficient quality to accurately represent the facial features. This first reference animation 201 and training data 203 combination may be stored as a part of the reference data 202.

Once the reference animation 201 is complete, then other training data 203 for other subjects may be more-quickly added to the reference data 202 by exploiting the use of the same set of predetermined training sentences and FACS facial expressions that were used for the reference animation 201 and that were spoken and performed by each user.

The audio component of the training data 203 may be used to synchronize the reference data 202's professionally-generated animations to subsequent performances. Specifically, dynamic time warping (DTW) alignment 204 reliant upon the audio and/or video recordings may be used to fairly-precisely map different portions of the overall animation to portions of each performance with limited manual input. This process is dramatically faster than performing complete human-aided animations of each new performance. Then, the corresponding animations may be applied to each subject's utterance of the predetermined training sentences.

The resulting animation, when combined with visual and audio reference data, the reference animation and the associated training data is used to create a viseme dataset 205. A "viseme" as used herein means the visual facial expressions of one pronouncing a given phoneme.

Next, the viseme dataset 205 can be provided to a convolutional neural network 206 along with mouth and eye FACS datasets 207 (which may be stored separately from one another) to generate a mouth regression model 208 and an eye regression model 209. These models 208 and 209 may be used, following training, by the convolutional neural network(s) to derive a probable animated character for a given set of input visual data from an eye image and/or mouth image that are a part of an overall video stream of a wearer of a head mounted display. In particular, the animation created by professional animators is used as "ground truth" for training the convolutional neural network(s) based upon the dynamically time scaled video data to teach the networks animations that should result from image data. Associated blendshape weightings for various animation parameters (for both eye and mouth) may also be derived from this training process. Over the course of multiple individuals and the same phonemes, the resulting training is quite robust.

Figure 3:
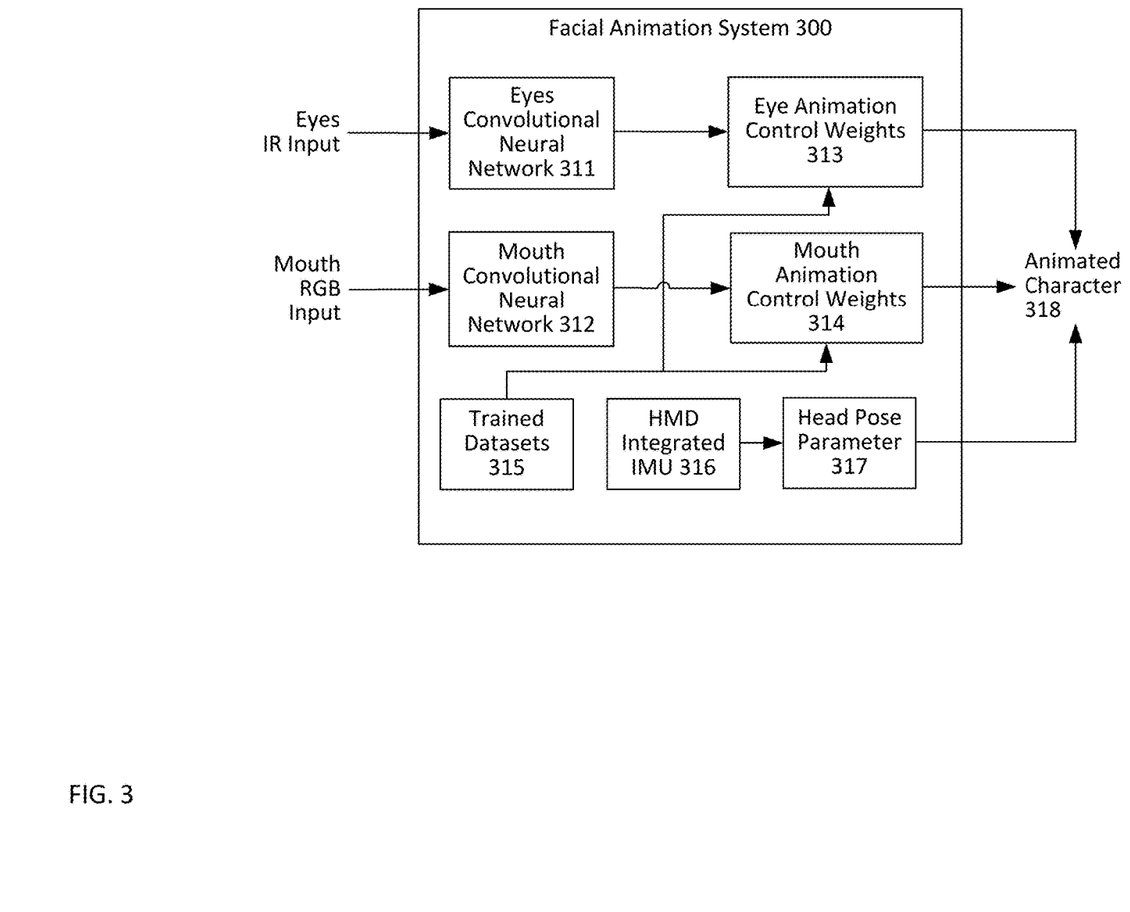
FIG. 3 is a functional diagram of a facial animation system for high-fidelity facial and speech animation for virtual reality head mounted displays.

FIG. 3 is a functional diagram of a facial animation system 300 for high-fidelity facial and speech animation for VR and AR head mounted displays. Once trained, the facial animation system 300 operates upon eyes IR input and mouth RGB input to generate an animated character face. The functional processes include an eyes convolutional neural network 311, a mouth convolutional neural network 312, eye and animation control weights 313, mouth animation control weights 314, the trained datasets 315 created by the training system 200 (FIG. 2). Finally, there is the head mounted display (HMD) integrated inertial measurement unit (IMU) 316 which creates a head pose parameter 317 for the position of a HDM wearer's head.

First, eye camera input in the form of a frame of image data from the IR camera (112 in FIG. 1) is received by the eyes convolutional neural network 311. IR is used because the eyes of a user wearing a virtual reality headset are in substantial darkness. The convolutional neural network, trained by data from the training system 200, creates a facial animation (position) for the eyes for the frame of image data. Details regarding the convolutional neural network will be discussed below with reference to FIG. 4.

Substantially simultaneously, mouth infrared input is received in the form of a frame of image data from an RGB mouth camera. This data is passed to the mouth convolutional neural network 312 for operation to determine the appropriate facial animation. As used herein the phrase "substantially simultaneously" is intended to imply near, but not necessarily perfect, synchronicity of operation. Because one or another process begins or ends either before or after another, does not necessarily mean those processes are not substantially simultaneous if they occur or are intended to occur, begin, or end at approximately the same time.

For the eyes convolutional neural network 311 speech animation control weights 313 derived during the training process are applied. For the mouth convolutional neural network 312, mouth animation control weights 314 are applied. Both of these rely upon the trained datasets 315 created by the training system 200.

Finally, the HMD integrated IMGU 316 provides at least one head pose parameter 317 (perhaps more) which may be integrated into the facial animation to show, for example, a head-tilt, a head turn, or other head pose detectible by the HDM integrated IMU 316.

All of these data sources converge into an animated head and facial animated character 318.

Figure 4:
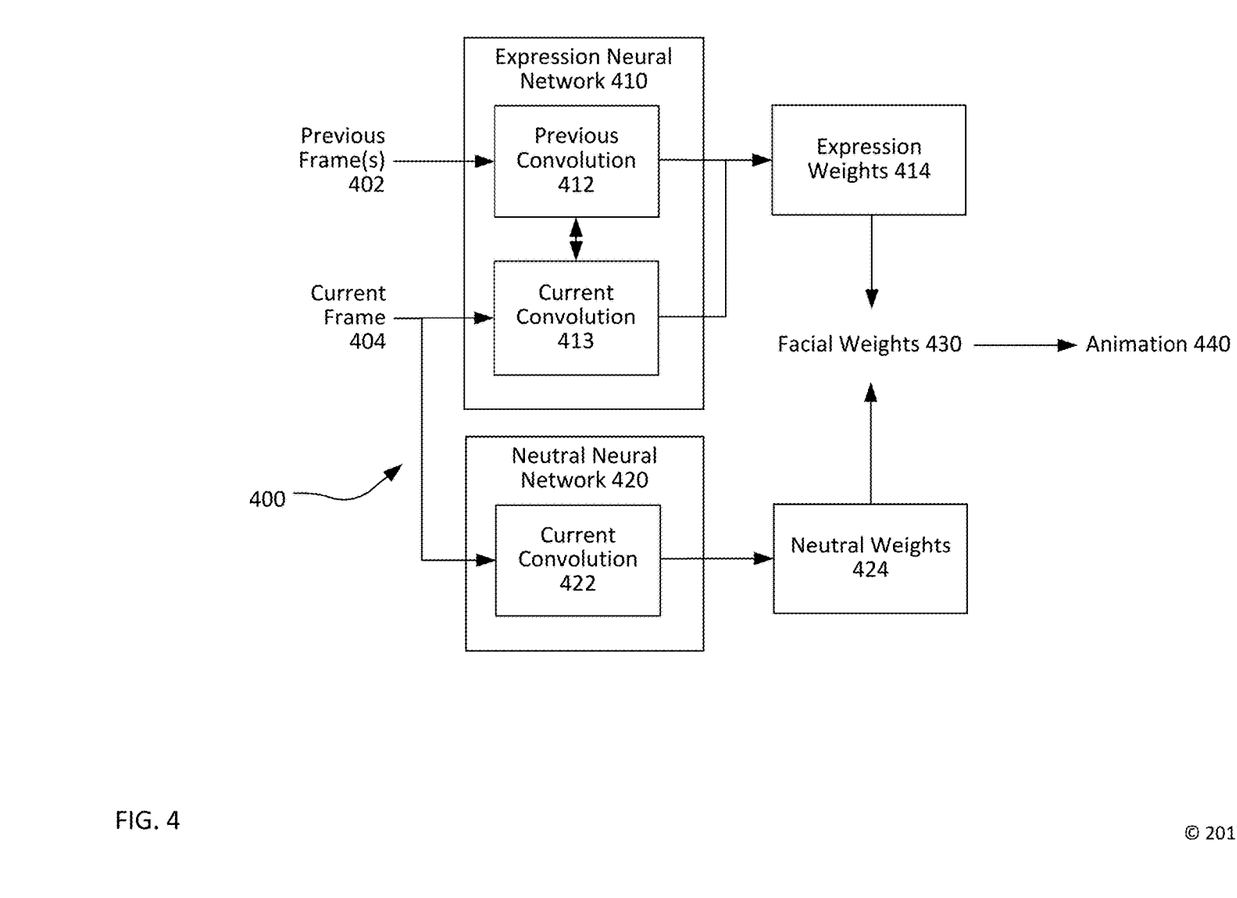
FIG. 4 is functional diagram of two neural networks used in a system for high-fidelity facial and speech animation for virtual reality head mounted displays.

FIG. 4 is functional diagram of two neural networks 400 used in a system for high-fidelity facial and speech animation for VR and AR head mounted displays. Each of the convolutional neural networks in the system 400 operates with reliance upon two neural networks, an expression neural network 410 and a neutral neural network 420. During training, the neural networks are trained to find the best correspondence while trying to match the expression using the expression neural network 410 and to bias toward a neutral expression using the neutral neural network 420. The final step is to also select appropriate blendshape weightings for the results of the expression neural network 410 and the neutral neural network 420 to most-closely approximate the desired animation.

Though only shown for one of the convolutional neural networks (e.g. the mouth convolutional neural network 312 of FIG. 3), the expression and neutral neural networks 410 and 420 may be used by the eyes convolutional neural network 311 as well.

Here, for the expression neural network 410, the previous frame 402 of image data and the current frame 404 are passed to the expression neural network 410. Simultaneously, the previous convolution 412 and the current convolution 413 operate upon the previous frame 402 and the current frame 404, with the results being combined. The previous convolution for the expression neural network 410 in particular enables the system to bias itself toward the results of the most-recent convolution on the most recent previous frame 402 so that expressions do not dramatically change from frame to frame of video.

Finally, the expression neural network 410 and the neutral neural network 420 provide their, respective, expression weights 414 and neutral weights 424 which determine the overall facial weights 430 to be applied (e.g. should each aspect of the face be more "expression oriented" or "neutral oriented").

Once the facial weights 430 are known, the results of the expression neural network 410 and the neutral neural network 420 are blended according to the facial weights 430 to derive the desired animation 440.

Description of Processes

Figure 5:
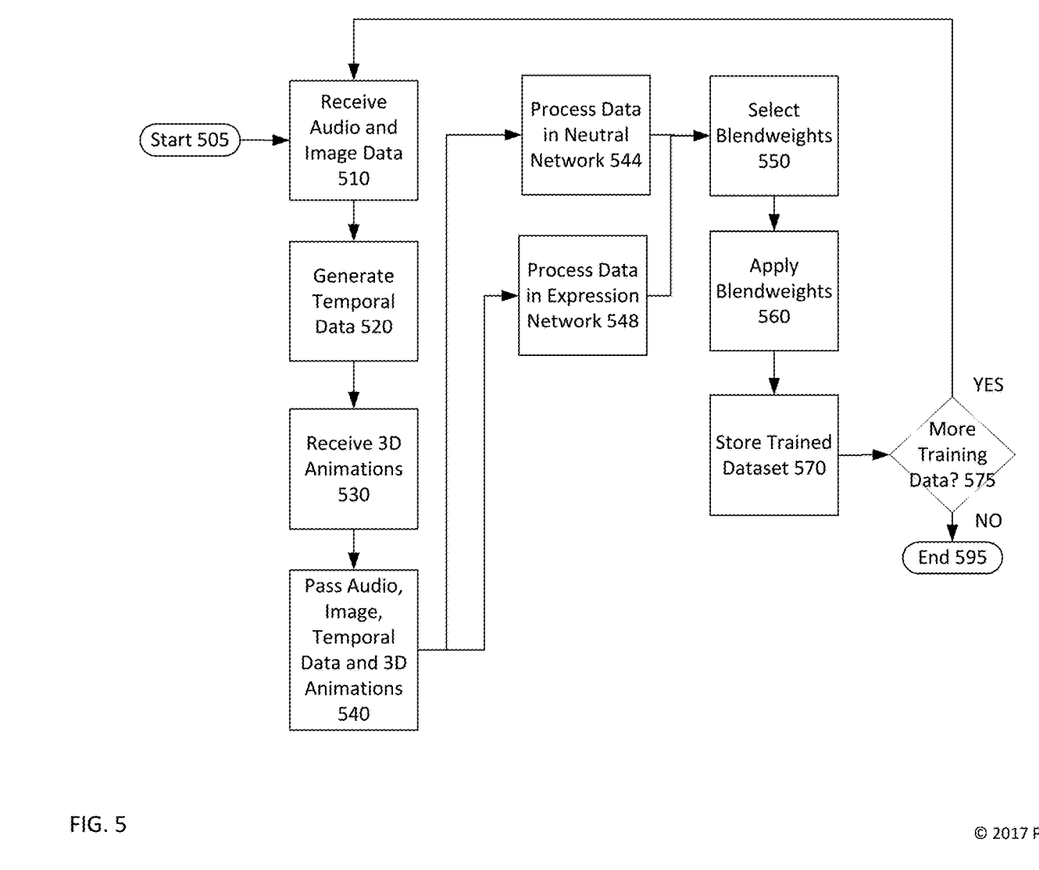
FIG. 5 is flowchart of a training process for high-fidelity facial and speech animation for virtual reality head mounted displays.

FIG. 5 is flowchart of a training process for high-fidelity facial and speech animation for VR and AR head mounted displays. The process has a start 505 and an end 595, but may take place many times, for example for each frame of audiovisual data from an audiovisual stream and, further, may be augmented with additional training data if it is provided at 575.

After the start 505, the process begins with the receipt of audio and image data at 510. The audio and image data may be a single video and audio stream, as discussed above, reciting a predetermined set of sentences which may be used to derive visemes suitable for use in composing animations from the audio and image data.

Next, temporal data is generated at 520 that may be used for performing the dynamic time warping so as to match resulting animations with later audio and image data. This temporal data flags certain phonemes/visemes as occurring at certain points within the audio and image data so that they may be matched to the later audio and image data.

Next, the 3D animations are received at 530. At this stage, as discussed above, one or more professional animators may be employed to create realistic animations from the captured audio and image data of a first performance. Though shown as a part of this process, this step may be skipped in subsequent training data for which only the original 3D animations may be used as "ground truth" for training the convolutional neural networks for all corresponding phonemes/visemes to which the same animation would apply. The dynamic time warping may be used on subsequent performances to dramatically shortcut the time required to derive suitable animations as FACS data. As discussed above, multiple "takes" from different performers are preferable to augment the capabilities of the resulting datasets used by the convolutional networks.

Next, the audio, image, and temporal data along with the 3D animations created by a professional animator are passed to the convolutional neural network at 540.

The neutral network may process the data passed to it at 544. The expression network likewise processes the data passed to it at 548. The resulting processing selects appropriate blendweights at 550 for use in applying the neutral network. This selection is based upon blendweights identified as ground truth based upon the training data. These blendweights are both within a particular neural network and without. Specifically, the blendweights identified in this processing affects the application of the particular neural network (e.g. neutral or expression) in subsequent convolutions, but also affects the relative application of the neutral neural network (e.g. more or less neutral bias) in the overall convolution process. So, the weighting applied to each of the convolutions is discovered separately from the blendweights applied within each of the neural networks.

At 560, the blendweights are applied so as to best cause the audio and image data to match the facial 3D animation provided at 530. The resulting datasets, including the appropriate blendweights are stored at 570 for later use when applying the convolutional networks to new audio and image data.

Finally, a determination is made whether there is additional training data at 575. This may, initially, merely be a determination whether there is an additional frame of an audiovisual stream of training data, for example, the user performing the predetermined sentences. However, if desirable, this may be a subsequent performance with its own associated 3D animations.

Figure 6:
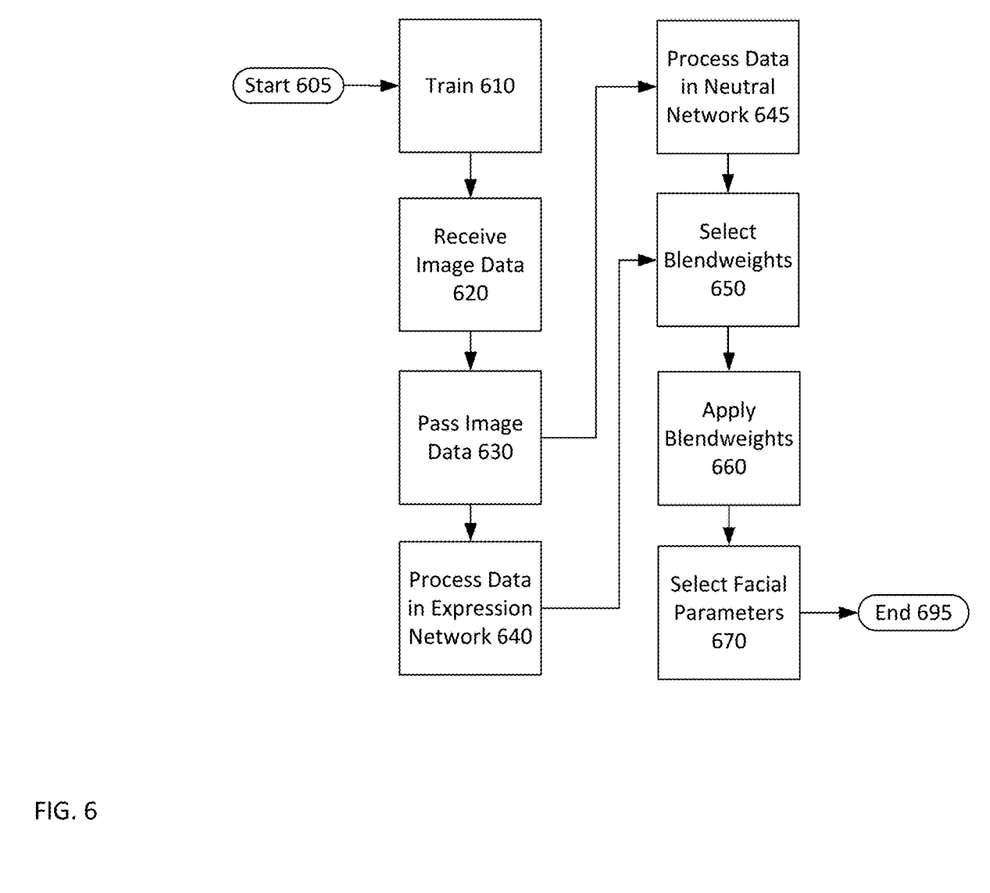
FIG. 6 is a flowchart of a process for creating high-fidelity facial and speech animation for virtual reality head mounted displays.

FIG. 6 is a flowchart of a process for creating high-fidelity facial and speech animation for VR and AR head mounted displays. This process may begin once the system is trained according to the processes described above with respect to FIG. 5. Though the process has a start 605 and an end 695, the process may take place many time, for example, for each frame of video received from both a mouth camera and an IR eye camera. In fact, the process may take place simultaneously for image data from a mouth camera and eye camera so as to generate a single facial animation incorporating both facial regions. For simplicity, the process will be described with reference to a single region, but the overall process remains the same with unification across an entire face.

First, the system may be trained at 610 on a new user. This step is intentionally shown as optional because, while one can train the system using the same predetermined sentences and facial expressions, there is no need to do so if the system has previously been trained on even a few sets of users. If training is desired, a later performer may repeat the same set of predetermined sentences and facial expressions that the original performers did so as to create a dataset from which to draw. The data may be saved and, using temporal data drawn from the audio component of the first performance combined with artist-generated facial animations, may be matched with the animations from the professional animator to derive blendweights for this specific performer (and each subsequent performer) based upon his or her performance. This process is substantially faster than the initial training, reliant upon one or more professional animators, but results in a combined set of data that is useful for animating this new user in dramatically less time once the initial training has been completed.

Once new user training is complete, image data is received at 610. The image data may be discarded or may be used as discussed briefly above, for communication by the avatar within the virtual environment.

The image data is then passed to the convolutional neural network at 630 for processing. Substantially simultaneously, the expression network 640 and the neutral neural network 645 process the image data from this new user to select blendweights at 650. The two distinct neural networks are applied, using the blendweights selected based upon the training datasets, the professionally-provided 3D animations, and the temporal training applied at 610 to create an appropriate facial animation.

As discussed above the neutral network 645 and the expression network 640 process independently with weightings applied to their results so as to best-approximate the facial expression. Those blendweights, both for the neural networks individually, and so as to blend the networks outputs together to create the best approximation are selected at 650. Next, those blendweights are applied at 660 to create the facial parameters for the facial animation at 670. Thereafter, a facial animation for the target frame of video may be created from those facial parameters.

FIG. 7 is a series 700 of examples of input video frames and the resulting animation using a system for high-fidelity facial and speech animation for VR and AR head mounted displays. Rows 702, 702' and 702" show mouth or eye poses or expressions and the corresponding column 704, 704' and 704" show the resulting facial animation on a generic face. As can be seen, the animations resulting from use of this system fall very close to the actual eye and mouth poses with no or very limited user-specific training.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of real-time facial animation comprising:
receiving video and audio of at least a portion of a performer's face from at least one performance of a predetermined set of phonemes and facial expressions;
generating a three-dimensional model of facial animations corresponding to the video and audio from the at least one performance relying in part upon temporal data for the at least one performance derived from the audio;
capturing a new performance of video and audio for a new performer's face including the predetermined set of phonemes and facial expressions;
applying a first convolutional neural network to derive a set of expression blendshape weights for each frame of the new performance of video, the expression blendshape weights also based upon at least one frame of video preceding a frame for which expression weights are sought;
applying a second convolutional neural network to each frame of the new performance of video to derive neutral facial weights;
applying a mapping function to the new performance to create a facial animation blending the results of the first convolutional neural network and the second convolutional neural network using the temporal data to match the facial animation to the new performance.

2. The method of claim 1 further comprising applying both the first and second convolutional neural networks to an unrelated video performance with a blendweight selected by the first and second convolutional neural networks to generate a facial animation that most-closely matches the unrelated video performance.

3. The method of claim 1 wherein the mapping function relies upon a blendshape weight vector for the first convolutional neural network and the second convolutional neural network that causes the mapping function to best corresponds to a face shape the new performance.

4. The method of claim 1 wherein the first convolutional neural network generates a three-dimensional map of a facial animation that best corresponds to the new performance.

5. The method of claim 1 wherein the at least one frame is two video frames of the new performance.

6. The method of claim 1 wherein the at least one performance is more than five performances.

7. The method of claim 1 wherein the generating the three-dimensional model is computer-assisted using temporal data derived from the at least one performance audio so as to temporally scale the at least one performance so as to automatically generate estimates of appropriate facial animations for each of the at least one performance.

8. Apparatus comprising a storage medium storing a program having instructions which when executed by a processor will cause the processor to:
receive video and audio of at least a portion of a performer's face from at least one performance of a predetermined set of phonemes and facial expressions;
generate a three-dimensional model of facial animations corresponding to the video and audio from the at least one performance relying in part upon temporal data for the at least one performance derived from the audio;
capture a new performance of video and audio for a new performer's face including the predetermined set of phonemes and facial expressions;
apply a first convolutional neural network to derive a set of expression blendshape weights for each frame of the new performance of video, the expression blendshape weights also based upon at least one frame of video preceding a frame for which expression weights are sought;
apply a second convolutional neural network to each frame of the new performance of video to derive neutral facial weights;
apply a mapping function to the new performance to create a facial animation blending the results of the first convolutional neural network and the second convolutional neural network using the temporal data to match the facial animation to the new performance.

9. The apparatus of claim 8 wherein the processor is further instructed to apply both the first and second convolutional neural networks to an unrelated video performance with a blendweight selected by the first and second convolutional neural networks to generate a facial animation that most-closely matches the unrelated video performance.

10. The apparatus of claim 8 wherein the mapping function relies upon a blendshape weight vector for the first convolutional neural network and the second convolutional neural network that causes the mapping function to best corresponds to a face shape the new performance.

11. The apparatus of claim 8 wherein the first convolutional neural network generates a three-dimensional map of a facial animation that best corresponds to the new performance.

12. The apparatus of claim 8 wherein the at least one frame is two video frames of the new performance.

13. The apparatus of claim 8 wherein the at least one performance is more than five performances.

14. The apparatus of claim 8 wherein generation of the three-dimensional model is computer-assisted using temporal data derived from the at least one performance audio so as to temporally scale the at least one performance so as to automatically generate estimates of appropriate facial animations for each of the at least one performance.

15. The apparatus of claim 8 further comprising:
the processor;
a memory; and
wherein the processor and the memory comprise circuits and software for performing the instructions on the storage medium.

16. A system for real-time facial animation comprising:
at least one camera and microphone for:
capturing video and audio of at least a portion of a performer's face from at least one performance of a predetermined set of phonemes and facial expressions;
capturing a new performance of video and audio for a new performer's face including the predetermined set of phonemes and facial expressions;
a processor for:
generating a three-dimensional model of facial animations corresponding to the video and audio from the at least one performance relying in part upon temporal data for the at least one performance derived from the audio;
applying a first convolutional neural network to derive a set of expression blendshape weights for each frame of the new performance of video, the expression blendshape weights also based upon at least one frame of video preceding a frame for which expression weights are sought;
applying a second convolutional neural network to each frame of the new performance of video to derive neutral facial weights;
applying a mapping function to the new performance to create a facial animation blending the results of the first convolutional neural network and the second convolutional neural network using the temporal data to match the facial animation to the new performance.

17. The system of claim 16 wherein the processor is further for applying both the first and second convolutional neural networks to an unrelated video performance with a blendweight selected by the first and second convolutional neural networks to generate a facial animation that most-closely matches the unrelated video performance.

18. The system of claim 16 wherein the mapping function relies upon a blendshape weight vector for the first convolutional neural network and the second convolutional neural network that causes the mapping function to best corresponds to a face shape the new performance.

19. The system of claim 16 wherein the first convolutional neural network generates a three-dimensional map of a facial animation that best corresponds to the new performance.

20. The system of claim 16 wherein generation of the three-dimensional model is computer-assisted using temporal data derived from the at least one performance audio so as to temporally scale the at least one performance so as to automatically generate estimates of appropriate facial animations for each of the at least one performance.

* * * * *